(12) United States Patent
Evans et al.

(10) Patent No.: US 8,116,323 B1
(45) Date of Patent: Feb. 14, 2012

(54) METHODS FOR PROVIDING PEER NEGOTIATION IN A DISTRIBUTED VIRTUAL ENVIRONMENT AND RELATED SYSTEMS AND COMPUTER PROGRAM PRODUCTS

(75) Inventors: James Evans, Apex, NC (US); Kunal Kandekar, Raleigh, NC (US); Richard Walsh, Raleigh, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 400 days.

(21) Appl. No.: 11/734,468

(22) Filed: Apr. 12, 2007

(51) Int. Cl.
*H04L 12/28* (2006.01)

(52) U.S. Cl. ...................................................... 370/400

(58) Field of Classification Search .................. 370/249, 370/400; 719/320–328; 463/42
See application file for complete search history.

(56) References Cited

U.S. PATENT DOCUMENTS

| | | | |
|---|---|---|---|
| 5,109,483 A * | 4/1992 | Baratz et al. .................. | 709/227 |
| 5,835,724 A | 11/1998 | Smith | |
| 5,838,909 A | 11/1998 | Roy et al. | |
| 5,892,900 A | 4/1999 | Ginter et al. | |
| 5,940,504 A | 8/1999 | Griswold | |
| 5,956,038 A | 9/1999 | Rekimoto | |
| 5,982,390 A | 11/1999 | Stoneking et al. | |
| 6,041,357 A | 3/2000 | Kunzelman et al. | |
| 6,119,229 A | 9/2000 | Martinez et al. | |
| 6,151,027 A | 11/2000 | Yoo | |
| 6,229,533 B1 | 5/2001 | Farmer et al. | |
| 6,285,380 B1 | 9/2001 | Perlin et al. | |
| 6,329,986 B1 | 12/2001 | Cheng | |
| 6,499,035 B1 | 12/2002 | Sobeski | |
| 6,577,328 B2 | 6/2003 | Matsuda et al. | |
| 6,697,948 B1 | 2/2004 | Rabin et al. | |
| 6,766,373 B1 | 7/2004 | Beadle et al. | |
| 6,767,287 B1 | 7/2004 | Mcquaid et al. | |
| 6,912,565 B1 * | 6/2005 | Powers et al. .................. | 709/205 |
| 6,938,085 B1 | 8/2005 | Belkin et al. | |
| 6,951,516 B1 | 10/2005 | Eguchi et al. | |
| 7,010,605 B1 | 3/2006 | Dharmarajan | |
| 7,065,553 B1 | 6/2006 | Chesley et al. | |
| 7,101,284 B2 | 9/2006 | Kake et al. | |
| 7,127,514 B2 | 10/2006 | Hunt | |
| 7,133,368 B2 * | 11/2006 | Zhang et al. .................. | 370/249 |
| 7,181,690 B1 | 2/2007 | Leahy et al. | |
| 7,244,181 B2 | 7/2007 | Wang et al. | |

(Continued)

FOREIGN PATENT DOCUMENTS

KR  1020030036290  5/2003

(Continued)

OTHER PUBLICATIONS

IEEE Network Jul./Aug. 2006—VON: A Scalable Peer-to-Peer Network for Virtual Environments by Hu et al.*

(Continued)

*Primary Examiner* — Ayaz R Sheikh
*Assistant Examiner* — Hai-Chang Hsiung
(74) *Attorney, Agent, or Firm* — Withrow & Terranova, PLLC

(57) ABSTRACT

Methods are provided that include recursively negotiating a boundary between a first virtual space controlled by a first peer and a second virtual space controlled by a second peer in a distributed virtual environment responsive to profile data of the first peer and the second peer. Related systems and computer program products are also discussed.

18 Claims, 7 Drawing Sheets

U.S. PATENT DOCUMENTS

| | | | |
|---|---|---|---|
| 7,245,620 | B2 | 7/2007 | Shankar |
| 7,249,139 | B2 | 7/2007 | Chuah et al. |
| 7,269,632 | B2 | 9/2007 | Edeker et al. |
| 7,293,235 | B1 | 11/2007 | Powers et al. |
| 7,388,585 | B2 | 6/2008 | Kristiansen |
| 7,421,708 | B2 * | 9/2008 | Vass et al. .................... 719/320 |
| 7,493,558 | B2 | 2/2009 | Leahy et al. |
| 7,512,071 | B2 | 3/2009 | Goldschmidt et al. |
| 7,685,224 | B2 | 3/2010 | Nye |
| 7,688,761 | B2 | 3/2010 | Paramaguru |
| 7,814,153 | B2 | 10/2010 | Flesch et al. |
| 7,814,154 | B1 | 10/2010 | Kandekar et al. |
| 7,831,707 | B2 | 11/2010 | Bardsley |
| 2001/0040895 | A1 | 11/2001 | Templin |
| 2001/0052008 | A1 | 12/2001 | Jacobus |
| 2002/0161893 | A1 | 10/2002 | Wical |
| 2002/0188678 | A1 | 12/2002 | Edecker et al. |
| 2003/0014423 | A1 | 1/2003 | Chuah et al. |
| 2003/0115132 | A1 | 6/2003 | Iggland |
| 2003/0126245 | A1 | 7/2003 | Feltin et al. |
| 2003/0158839 | A1 | 8/2003 | Faybishenko et al. |
| 2003/0177187 | A1 | 9/2003 | Levine et al. |
| 2004/0002342 | A1 | 1/2004 | Goldberg et al. |
| 2004/0019657 | A1 | 1/2004 | Akiyama |
| 2004/0152519 | A1 | 8/2004 | Wang et al. |
| 2004/0215756 | A1 | 10/2004 | VanAntwer et al. |
| 2005/0021394 | A1 | 1/2005 | Miedema et al. |
| 2005/0054447 | A1 | 3/2005 | Hiroyama et al. |
| 2005/0203922 | A1 | 9/2005 | Uhlir et al. |
| 2005/0204045 | A1 | 9/2005 | Belkin et al. |
| 2006/0095763 | A1 | 5/2006 | Iyengar et al. |
| 2006/0123127 | A1 | 6/2006 | Littlefield |
| 2006/0178967 | A1 | 8/2006 | Jung et al. |
| 2006/0178972 | A1 | 8/2006 | Jung et al. |
| 2006/0248573 | A1 | 11/2006 | Pannu et al. |
| 2007/0021110 | A1 | 1/2007 | Chaudhri et al. |
| 2007/0087819 | A1 | 4/2007 | Van Luchene et al. |
| 2007/0099685 | A1 | 5/2007 | Van Luchene |
| 2007/0112660 | A1 | 5/2007 | Jung et al. |
| 2007/0184903 | A1 | 8/2007 | Liu et al. |
| 2007/0186212 | A1 * | 8/2007 | Mazzaferri et al. ................ 718/1 |
| 2007/0191104 | A1 | 8/2007 | Van Luchene |
| 2007/0270225 | A1 | 11/2007 | Wang et al. |
| 2007/0271301 | A1 | 11/2007 | Klive |
| 2007/0288598 | A1 | 12/2007 | Edeker et al. |
| 2007/0294387 | A1 | 12/2007 | Martin |
| 2008/0004116 | A1 | 1/2008 | Van Luchene et al. |
| 2008/0004120 | A1 | 1/2008 | Van Luchene et al. |
| 2008/0046222 | A1 | 2/2008 | Van Luchene |
| 2008/0063002 | A1 | 3/2008 | Zheng et al. |
| 2008/0071854 | A1 | 3/2008 | Gall et al. |
| 2008/0090659 | A1 | 4/2008 | Aguilar et al. |
| 2008/0109519 | A1 | 5/2008 | Aaltonen et al. |
| 2008/0201321 | A1 | 8/2008 | Fitzpatrick et al. |
| 2008/0207327 | A1 | 8/2008 | Van Luchene et al. |
| 2009/0111450 | A1 | 4/2009 | Okita et al. |
| 2009/0113421 | A1 | 4/2009 | Hamilton, II et al. |
| 2009/0124387 | A1 | 5/2009 | Perlman et al. |
| 2009/0141047 | A1 | 6/2009 | Bates et al. |
| 2009/0172157 | A1 | 7/2009 | Zhang |
| 2009/0276707 | A1 | 11/2009 | Hamilton, II et al. |
| 2009/0319681 | A1 | 12/2009 | Freelander et al. |
| 2009/0325712 | A1 | 12/2009 | Rance |
| 2010/0156899 | A1 | 6/2010 | Bolger et al. |
| 2010/0280890 | A1 | 11/2010 | Park et al. |
| 2010/0306652 | A1 | 12/2010 | Bolger et al. |

FOREIGN PATENT DOCUMENTS

| | | |
|---|---|---|
| WO | 98/47091 A1 | 10/1998 |
| WO | 00/42555 A1 | 7/2000 |
| WO | 01/22273 A1 | 3/2001 |
| WO | 03/081447 A1 | 10/2003 |
| WO | 2007/011752 A2 | 1/2007 |
| WO | WO 2007/124590 A1 | 11/2007 |

OTHER PUBLICATIONS

VON: A Scalable Peer-to-Peer Network for Virtual Environments by Hu et al.—IEEE2006.*

VELVET: An Adaptive Hybrid Architecture for Very Large Virtual EnvironmenTs by Oliveira et al.—IEEE2002.*

Tanin et al., "A Serverless 3D World" Proceedings of the 12th Annual ACM International Workshop on Geographic Information Systems, 2004, ACM.*

Gehrmann, "P2P Based Distributed Virtual Reality—a DVE Architecture and Implementation", Feb. 2004, Institute of Informatics and Mathematical Modeling, Technical University of Denmark.*

Shun-Yun Hu et al., "Scalable Peer-to-Peer Networked Virtual Environment," (article), Aug. 2004, pp. 129-133, in Proc. 3rd ACM SIGCOMM 2004 workshops on NetGames '04.

Takuji Iimura et al., "Zoned Federation of Game Servers: a Peer-to-peer Approach to Scalable Multi-player Online Games," (article), Aug. 2004, pp. 116-120, in Proc. 3rd ACM SIGCOMM 2004 workshops on NetGames '04.

Jouni Smed et al., "A Review on Networking and Multiplayer Computer Games," (article), Apr. 2002, pp. 30, Technical Report No. 454, Turku Centre for Computer Science.

No Author, "Multiverse Technology: An Overview," (article), 2005, 12 pages, http://www.multiverse.net/platform/whitepapers/mv_overview.pdf.

Bjorn Knutsson et al., "Peer-to-Peer Support for Massively Multiplayer Games," (article), Mar. 2004, 12 pages, In the 23rd Conference of the IEEE Communications Society (INFOCOM '04), Hong Kong, China.

No Author, Main Page—Solipsis, (website), obtained Feb. 6, 2007, 2 pages, http://solipsis.netofpeers.net/wiki2/index.php/Main_Page.

No Author, "The final COVEN multi-user VR platform—D1.4a The COVEN DIVE platform," (article), Aug. 30, 1998, 49 pages, http://coven.lancs.ac.uk/4/deliverables/del14a.pdf.

No Author, Dive Tutorial, (website), obtained Mar. 19, 2007, 8 pages, http://www.sics.se/dive/manual/tutorial/.

No Author, Uni-verse Home, (website), obtained Mar. 19, 2007, 4 pages, http://www.uni-verse.org/Uni-verse-Home.72.0.html.

No Author, Uni-verse On-line Gaming, (website), obtained Mar. 19, 2007, 3 pages, http://www.uni-verse.org/On-line-Gaming.49.0.html.

No Author, Public-key cryptography—Wikipedia, (website), obtained Mar. 19, 2007, 12 pages, http://en.wikipedia.org/wiki/Public-key_cryptography.

No Author, Solipsis—Wikipedia, (website), obtained Mar. 19, 2007, 4 pages, http://en.wikipedia.org/wiki/Solipsis.

David Youd, What is a Digital Signature? An introduction to Digital Signatures, (article), obtained Apr. 5, 2007, 4 pages, http://www.youdzone.com/signature.html.

No Author, Microsoft masthead frame with global toolbar, (website), obtained Oct. 10, 2007, 3 pages, http://www.microsoft.com/resources/documentation/windows/xp/all/proddocs/en-us/sag_liceconcepts_401.mspx?mfr=true.

Nejdl Wolfgang et al., "Super-Peer-Based Routing Strategies for RDF-Based Peer-to-Peer Networks," (article), Nov. 18, 2003, 15 pages.

No Author, "P2P and Content Distribution," (PowerPoint Presentation), Oct. 25, 2005, 20 pages, http://www.list.gmu.edu/zhang/isa767/p2p-6.pdf.

Yingwu Zhu et al., "A Super-Peer Based Lookup in Structured Peer-to-Peer Systems," (article), 2003, 6 pages.

Beverly Yang et al., "Designing a Super-Peer Network," (article), 2003, 15 pages, ICDE, 19th International Conference on Data Engineering (ICDE'03).

Juan Li, "ECSP: An Efficient Clustered Super-Peer Architecture for P2P Networks," (article), Aug. 2003, 82 pages, The University of British Columbia.

Young-Bae Ko et al., "A Multicast Protocol for Physically Hierarchical Ad Hoc Networks," (article), 2003, 5 pages.

No Author, Gnutella—Wikipedia, (website), obtained Feb. 20, 2007, 5 pages, http://en.wikipedia.org/wiki/Gnutella.

No Author, Gnutella 2—Wikipedia, (website), obtained Feb. 20, 2007, 4 pages, http://en.wikipedia.org/wiki/Gnutella2.

Paul Beskow et al., "Latency Reduction in Massively Multi-player Online Games by Partial Migration of Game State," (article), Sep. 4-7, 2007, 10 pages, Second International Conference on Internet Technologies and Applications.

Alvin Yun-Wen Chen, "A Hybrid Architecture for Massively Scaled Distributed Virtual Environments," (thesis), 2007, 68 pages, UCLA Multimedia Systems Laboratory, http://74.125.113.132/search?q=cache:hk3L8knLVxoJ:www.cs.ucla.edu/~alchemy/pubs/prospectus.pdf+%22Chen%22+%22Hybrid+Architecture+*+Massively%22&hl=en&ct=clnk&cd=1&gl=us.

Adwait Tumbde et al., "A Voronoi Partitioning Approach to Support Massively Multiplayer Online Games," (article), 2004, 8 pages, CS 740 Project, The University of Wisconsin, Madison.

Amjad Akkawi et al., "A Mobile Gaming Platform for the IMS," (article), 2004, pp. 77-84, in SIGCOMM'04 Workshops, ACM, http://conferences.sigcomm.org/sigcomm/2004/workshop_papers/net501-akkawi.pdf.

Mojtaba Hosseini et al., "Visibility-based Interest Management in Collaborative Virtual Environments," (article), Sep. 30-Oct. 2, 2002, pp. 143-144, Proceedings of the 4th international conference on Collaborative virtual environments, Bonn, Germany.

Jean-Sébastien Boulanger, "Comparing Interest Management Algorithms for Massively Multiplayer Games," (article), Oct. 30-31, 2006, Proceedings of 5th ACM SIGCOMM Workshop on Network and System Support for Games, Singapore.

No Author, HTTP Cookie—Wikipedia, (website), obtained Feb. 5, 2009, 19 pages, http://en.wikipedia.org/wiki/HTTP_cookie.

No Author, "Cluster (computing)—Wikipedia," (website), obtained Feb. 20, 2009, 6 pages, http://en.wikipedia.org/wiki/Computer_cluster.

Marcos Rates Crippa et al., "Peer-to-peer support for instance-based massively multiplayer games," (article), date unknown, 4 pages, http://www.inf.unisinos.br/~sbgames/anais/shortpapers/34739.pdf.

Shun-Yun Hu et al., "A Case for Peer-to-Peer 3D Streaming," (article), 2006, 8 pages, ASCEND Technical Report (ASCEND-TR-002-2006A), http://ascend.sourceforge.net/docs/pub/ASCEND-TR-002-2006A.pdf.

Shun-Yun Hu et al., "A Case for 3D Streaming on Peer-to-Peer Networks," (article), Apr. 18-21, 2006, pp. 57-64, Proceedings of the Eleventh International Conference on 3D Web Technology, Columbia, Maryland, http://www.web3d.org/x3d/learn/web3d_2006/057-hu.pdf.

Castronova, Edward, "On Virtual Economies," CESifo Working Paper No. 752, Jul. 2002.

Fairfield, Joshua, "Virtual Property," Research Paper No. 35, Oct. 2005, Indiana University School of Law—Bloomington.

Bartle, Richard A., "Pitfalls of Virtual Property," Apr. 2004, The Themis Group.

No Author, "Virtual Economy," Screenshot of Wikipedia from Dec. 15, 2005, Accessed Jun. 16, 2010.

Tanin, E. et al., "A Serverless 3D World" Proceedings of the 12th Annual ACM International Workshop on Geographic Information Systems, 2004, ACM, New York, NY.

Schmalstieg, D. et al., "Sewing Worlds Together with SEAMS: A Mechanism To Construct Complex Virtual Environments," 1999.

Gehrmann, H., "P2P Based Distributed Virtual Reality. TerraPeer—a DVE Architecture and Implementation", Feb. 2004, Institute of Informatics and Mathematical Modeling, Technical University of Denmark (DTU).

Tanin, E. et al., "Building and Querying a P2P Virtual World," Geoinformatica, Mar. 2006, vol. 10, No. 1, Kluwer Academic Publishers, Hingham, MA.

* cited by examiner

METHODS FOR PROVIDING PEER NEGOTIATION IN A DISTRIBUTED VIRTUAL ENVIRONMENT AND RELATED SYSTEMS AND COMPUTER PROGRAM PRODUCTS

FIELD OF THE INVENTION

The present invention relates to the field of computers, and more particularly, to virtual environments and related methods, systems and computer program products.

BACKGROUND

In recent decades, there has been rapid growth in the number of computers, and thus people, connected to the Internet, a vast network of computers connected by common communication protocols and data formats, and the World-Wide Web (WWW), a layer of structured information transmitted over the Internet. This increase of connectivity has allowed computer users to access various types of information, disseminate information, participate in electronic commerce transactions, as well as engage in various forms of social interaction and entertainment previously limited by geographic and/or socio-political bounds.

For example, people can send electronic messages, play games and collaborate on work projects concurrently with other users regardless of terrestrial or extraterrestrial bounds. Several people can simultaneously provide inputs into a shared computer program and thus participate in the shared computer program. Each participant's actions, decisions, etc. can affect the shared virtual environment and thus affect the shared virtual environment for all participants. Such programs may be known as multi-user, interactive applications.

A common type of interactive computer experience is the simulation. In its most general sense, a simulation is the imitative representation of the functioning of a system or process. In many cases, a user is presented with a representation of some experience, such as performing an activity. There are many types of simulators. One example is a flight simulator, in which a user interacts with a computer that provides the user with a visual experience of flying an aircraft. Simulators can be used for training, research, entertainment, education, as well as many other suitable activities. With the increasing sophistication of computer hardware, simulations can be advantageously utilized in the context of multi-user interactive applications. For example, virtual environments may be provided for multiple users to interactively participate in.

Virtual environments for multiple users may involve the use of a single large central computer. Users may send or receive data from the central computer, while computationally intensive operations are performed on the central computer. In such virtual environments, the amount of computation involved may exceed the capabilities of many computer systems. Other systems may subdivide a virtual environment, but not in a contiguous way. Yet other systems may use a grid of computers to provide a virtual environment; however, cells and/or regions of the virtual environment may not be continuous.

In some cases, because the virtual environment persists even after the user logs out, some virtual environments may also be known as Persistent-State World (PSW) environments. Virtual environment applications may be distributed independently of multi-user environments on CD-ROM or DVD or available for download over the Internet. These virtual environment applications typically connect to their own servers.

One common characteristic among the various multi-person interactive applications, such as virtual environments, is that they are based on the client-server paradigm. This means that most of the processing involved in executing these multi-person interactive applications is centralized on the server computers to which the client computers are connected. This method of creating a virtual community is not entirely scalable or reliable. For example, typically, because of the limited scalability, only a small subset of simultaneous users can interact with one another at any time.

Absent the presence of one or more a central computers and/or simulation servers for defining space and maintaining persistent states, however, establishing a distributed virtual environment using a network of peers presents challenges due to disparate system capacities and virtual environmental conditions.

Notwithstanding the methods discussed above, there continues to exist a need for methods, systems, and computer program products for providing a distributed virtual environment.

SUMMARY

According to some embodiments of the present invention, peer-to-peer negotiation between first and second peers in a distributed virtual environment is provided. Methods according to some embodiments include receiving profile data at the first peer controlling a first virtual space in the distributed virtual environment from the second peer controlling a second virtual space adjacent to the first virtual space in the distributed virtual environment. Relative profile data is determined by comparing profile data of the first peer and the profile data of the second peer and a boundary between the first virtual space and the second virtual space is adjusted responsive to the relative profile data.

Some embodiments may include serving a client controlling an agent that exists within the distributed virtual environment by providing at least one virtual object. In some embodiments, if the agent is in the first virtual space then the first peer serves the client. If the agent is in the second virtual space the second peer serves the client and if the agent moves from the first virtual space to the second virtual space then the second peer begins to serve the client responsive to the agent traversing the boundary. In some embodiments, the agent interacts with the at least one virtual object responsive to a location of the agent relative to the boundary.

In some embodiments, a client controls an agent in the distributed virtual environment. In such embodiments, adjusting the boundary includes defining an approximation space extending beyond the boundary and configured to transition the agent from the first virtual space to the second virtual space. In some embodiments, the approximation space changes dimensionally in response to relative profile data. In further embodiments, the approximation space changes location relative to the boundary in response to relative profile data.

In some embodiments, the profile data includes hardware data, virtual object data, and/or client data.

Some embodiments include defining a boundary traversable zone configured to define portions of the boundary that are traversable by a client to move from one of the first virtual space or the second virtual space to another of the first virtual space or the second virtual space.

In some embodiments, receiving profile data is performed responsive to the second peer joining the distributed virtual environment. In some embodiments, the profile data may be received responsive to a change in profile data of the first peer and/or the second peer.

In some embodiments, relative profile data includes a difference in hardware capacity between the first peer and the second peer. In further embodiments, the relative profile data may include a difference in client data.

Some embodiments may include receiving third peer profile data at the first peer from a third peer controlling a third virtual space adjacent to the first virtual space in the distributed virtual environment, determining third peer relative profile data by comparing the profile data of the first peer and the third peer profile data, and adjusting third peer boundary between the first virtual space and the third virtual space responsive to the third peer relative profile data.

In some embodiments, the boundary may be adjusted by reducing the first virtual space responsive to relative profile data indicative of greater resources of the second peer than the resources of the first peer.

Some methods according to the invention include recursively negotiating a boundary between a first virtual space controlled by a first peer and a second virtual space controlled by a second peer in a distributed virtual environment responsive to profile data of the first peer and the second peer.

Some embodiments include serving a client that controls an agent that navigates the first virtual space served by the first peer and the second virtual space served by the second peer. The client is served by the first peer while the agent is in the first virtual space and the second peer while the agent is in the second virtual space.

Some embodiments include transitioning client service from the first peer to the second peer when the agent traverses the boundary between the first virtual space and the second virtual space.

In some embodiments, recursively negotiating includes compensating for disparate system capacity between the first peer and the second peer.

Some embodiments may include a computer program product that includes a computer usable storage medium having computer-readable program code embodied in the medium, the computer readable program code configured to perform the methods herein.

DETAILED DESCRIPTION

Figure 1A:
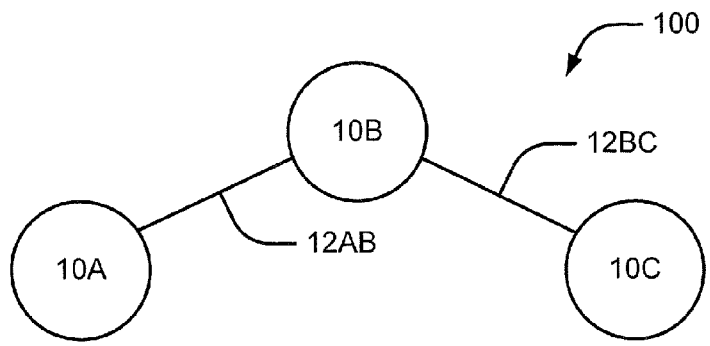
FIGS. 1A and 1B are block diagrams illustrating a peer connection diagram and corresponding landscape diagram, respectively, of a simplified distributed virtual environment according to some embodiments of the present invention.

The present invention now will be described more fully hereinafter with reference to the accompanying drawings, in which illustrated embodiments of the invention are shown. This invention may, however, be embodied in many different faints and should not be construed as limited to the embodiments set forth herein. Rather, these embodiments are provided so that this disclosure will be thorough and complete, and will fully convey the scope of the invention to those skilled in the art. Like numbers refer to like elements throughout.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the teens first, second, etc. may be used herein to describe various elements, these elements should not be limited by these terms. These terms are only used to distinguish one element from another. For example, a first multimedia device could be teemed a second multimedia device, and, similarly, a second multimedia device could be termed a first multimedia device without departing from the teachings of the disclosure.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain or store the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM).

The present invention is described herein with reference to flowchart and/or block diagram illustrations of methods, systems, and devices in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computing device (such as a computer or other programmable data processing apparatus) to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Unless otherwise defined, all teens (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly faunal sense unless expressly so defined herein.

Figure 1B:
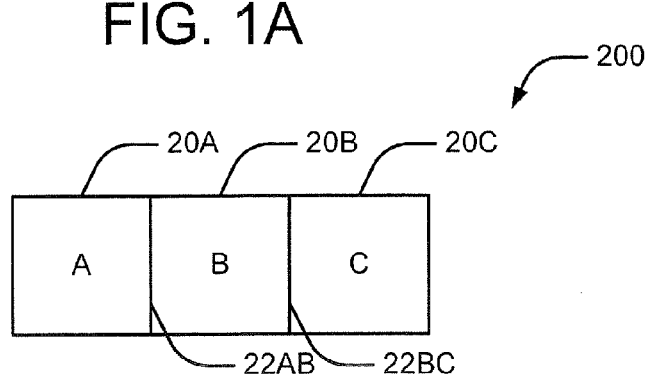

Reference is now made to FIGS. 1A and 1B, which are a block diagrams illustrating a peer connection diagram and corresponding landscape diagram, respectively, of a simplified distributed virtual environment according to some embodiments of the present invention. As illustrated in FIG. 1A, peers 10A-10C may be communicatively coupled through network connections 12AB and 12BC to form a peer-to-peer (P2P) network 100. Connections between peers may include direct connections and/or logical connections that may be supported by one or more intervening devices. For example, in some embodiments, a peer 10A-10C may provide a proxy connection for two or more peers that are not directly connected. Further, connections between peers 10A-10C may include one or more intermediate nodes, such as, for example, firewalls and proxy servers, among others. The network 100 may include, among others the interne, a local area network (LAN), and/or a wide area network (WAN) and may include wired and/or wireless communication technologies. While the invention is suitable for use over an extended version of the HTTP protocol for communication, any protocol capable of providing communications between peers and/or nodes is within the scope and spirit of the invention. In some embodiments, the network 100 may be a dynamic ad-hoc network, such as established by various short range wireless technologies, such that peers 10A-10C may join and quit the network 100 without disrupting other network functions, processes and/or connections.

Referring now to FIG. 1B, the distributed virtual environment 200 includes virtual spaces 20A-20C controlled by the peers 10A-10C, respectively. The virtual spaces 20A-20C are arranged such that each pair of peers 10A-10C that are communicatively coupled by network connections 12AB and 12BC control adjacent virtual spaces 20A-20C and thus have shared boundaries 22AB and 22BC. For example, in FIGS. 1A and 1B, peer 10A and peer 10B are connected via a network connection 12AB and control virtual spaces 20A and 20B, respectively, which are adjacent and share a boundary 22AB. Further, since peers 10A and 10C do not have a network connection 12, the virtual spaces 20A and 20C are not adjacent in the distributed virtual environment 200. In some embodiments, the boundaries may be established via an external source and/or device. In some embodiments, network connections may be established responsive to boundary creation, generation and/or negotiation.

Figure 2A:
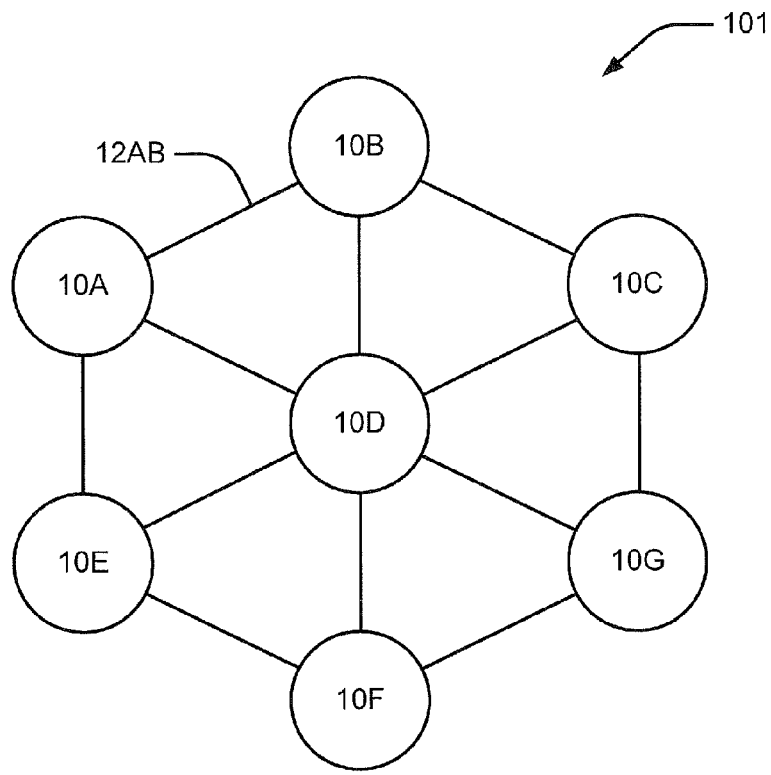
FIGS. 2A and 2B are a block diagrams illustrating a peer connection diagram and corresponding landscape diagram, respectively, of a more complex distributed virtual environment according to some embodiments of the present invention.
Figure 2B:
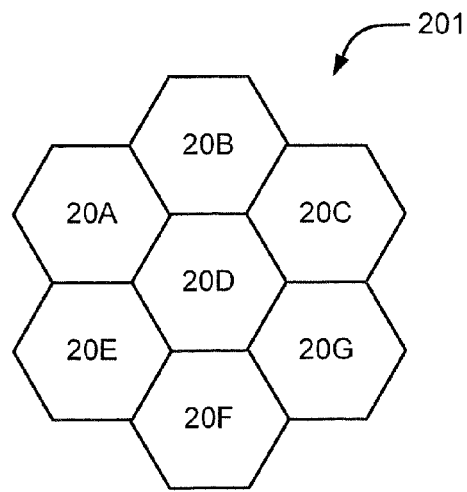

Reference is now made to FIGS. 2A and 2B, which are a block diagrams illustrating a peer connection diagram and corresponding landscape diagram, respectively, of a more complex distributed virtual environment according to some embodiments of the present invention. As illustrated in FIG. 2A, a network 101 may increase in complexity as the number of peers 10A-10G and network connections 12 between them increase. Accordingly, as illustrated in FIG. 2B, the virtual environment landscape 201 may include virtual spaces 20A-20G having geometries and shared boundaries consistent with the additional peers 10A-10G and network connections 20. In some embodiments, geometries may be generated responsive to network connections 20 and/or consistency with additional peers 10A-10G. For example, in a network 101 that supports up to six network connections 12 for each peer 10A-10G, a virtual space 20A-20G may be defined as a hexagon such that the virtual environment may be referred to as a hexaverse.

While a hexagon is a convenient geometry for the examples herein, a distributed virtual environment may include virtual spaces with a variety of uniform and/or non-uniform shapes and in one or more dimensions. For example, in a simple example, a virtual environment may be a series of one dimensionally arranged virtual experiences along a linear virtual continuum. Similarly, in some embodiments, a distributed virtual environment may include spaces defined in more than two dimensions, such as in a three dimensional array. In a two-dimensional arrangement, for example, the hexagon includes the characteristic of providing a virtual environment without holes between the peers. In some embodiments, hexagons can be configured to collectively wrap around non-planar surfaces. In some embodiments, virtual spaces 20A-

20G in a distributed virtual environment 201 may be defined by coordinate systems that define the coordinates of each of the boundaries and/or borders. In some embodiments, the virtual spaces 20A-20G may be identified using identifiers and/or position indicators that may be unique within the distributed virtual environment 201.

Figure 3:
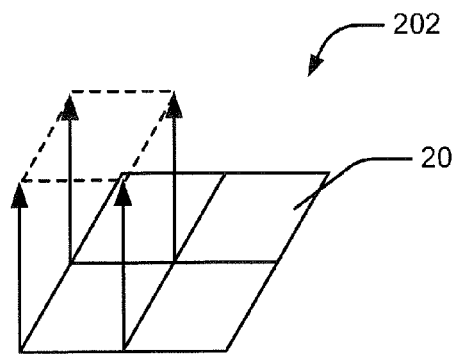
FIG. 3 is a block diagram illustrating a two-dimensional landscape diagram of a distributed virtual environment according to some embodiments of the present invention.
Figure 4:
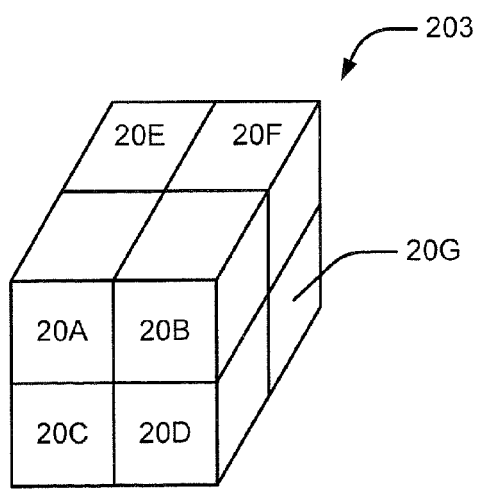
FIG. 4 is a block diagram illustrating a three-dimensional landscape diagram of a distributed virtual environment according to some embodiments of the present invention.

Brief reference is now made to FIG. 3, which is a block diagram illustrating a two-dimensional landscape diagram of a distributed virtual environment 202 according to some embodiments of the present invention. In some embodiments, a distributed virtual environment 200 may include virtual spaces 20 that include a defined surface area and all of the space directly above that surface area. In this manner, a peer 10 can control and/or "own" the virtual space 20 of the surface area defined by the boundaries all the way to the virtual sky. In some embodiments, as illustrated in FIG. 4, a distributed virtual environment 203 may include virtual spaces 20A-20G that are defined as three-dimensional space and are configured to share boundaries in three dimensions. For example, note that the virtual space 20B controlled by peer 10B includes boundaries, as defined by common areas, with virtual spaces 20A, 20D and 20F controlled by peers 10A, 10D, and 10F in three different dimensional directions. In some embodiments, the virtual space 20B may include boundaries, defined by common lines, with diagonally positioned virtual spaces 20C and 20E controlled by peers 10C and 10E. In some embodiments, an N-dimensional distributed virtual environment may include boundaries having, for example N dimensions. For example, a boundary between two three-dimensional virtual spaces may be 1, 2, or three-dimensional.

Figure 5:
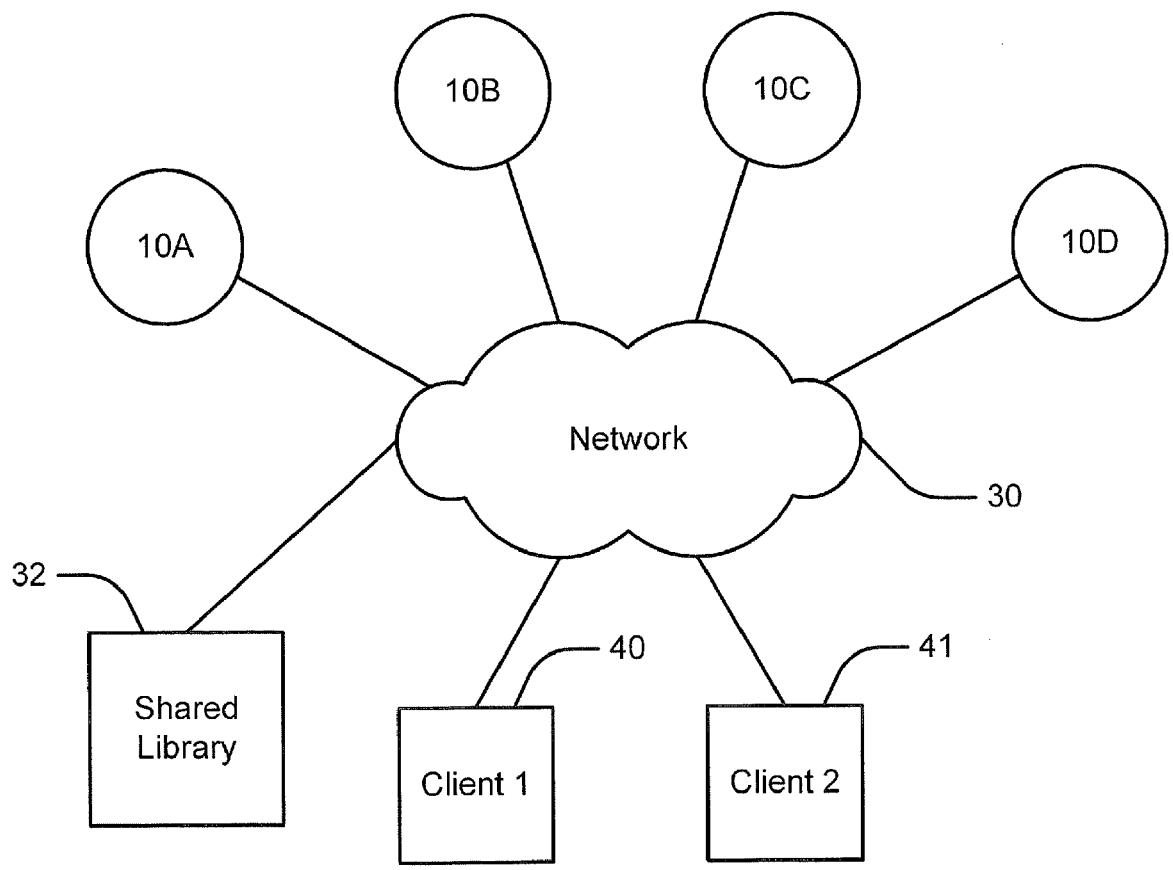
FIG. 5 is a block diagram illustrating a network for a distributed virtual environment according to some embodiments of the present invention.

Reference is now made to FIG. 5, which is a block diagram illustrating a network for a distributed virtual environment according to some embodiments of the present invention. A network 30 may be configured to provide network connections between, for example, multiple peers 10A-10D that control multiple virtual spaces in a distributed virtual environment. Individual peers 10A-10D that are in logical communication with each other may control adjacent virtual spaces in the distributed virtual environment. The network may also be connected to a shared library 32 that may be configured to provide resources to the peers 10. Such resources may be utilized to configure the virtual spaces in the distributed virtual environment. In some embodiments, the shared library may include templates for creating virtual objects, virtual objects, virtual object textures, virtual lighting characteristics, colors, and/or object interaction definitions, among others. Objects and features in the library may be cataloged using unique identifiers that can be shared among the peers. In some embodiments, the shared library may be implemented in a central server, a distributed system, and/or on local servers such as, for example, peer servers.

Clients 40, 41 may be software applications operated by users and may each navigate the distributed virtual environment using an agent or avatar. In some embodiments, a client application may operate on a variety of mobile, fixed position, and/or personal processing and/or communication devices including computers, cell phones, game devices, and/or personal digital assistants (PDA's). The agent is a virtual entity that represents a user in the distributed virtual environment. The clients 40, 41 are distinct from peers 10A-10D and may not be aware of the interconnections between peers 10A-10D and/or the states of the various peers 10A-10D. As the agents navigate the distributed virtual environment, the peers 10A-10D instruct the clients 40, 41 to connect with other peers 10A-10D based on locations and/or directions of travel of the agents. While navigating the distributed virtual environment, users may interact with each other via the interaction of their agents. In some embodiments, agents may be generated by users to include, for example, user specific and/or custom graphic content.

Figure 6:
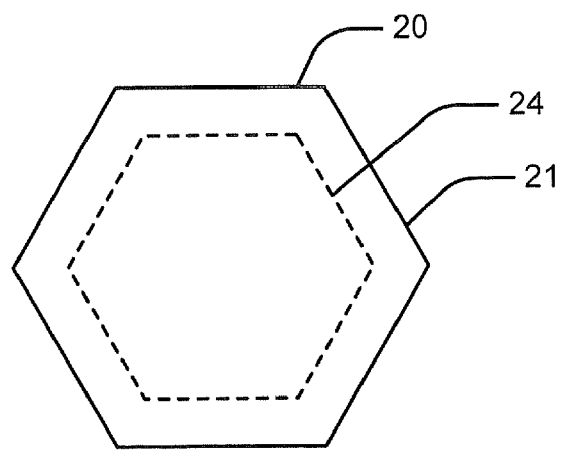
FIG. 6 is a block diagram illustrating a negotiated boundary for a virtual space in a distributed virtual environment according to some embodiments of the present invention.

Reference is now made to FIG. 6, which is a block diagram illustrating negotiated boundary for a virtual space in a distributed virtual environment according to some embodiments of the present invention. In some embodiments, a virtual space 20 may be controlled by a disparate peer that has sub-optimal conditions, capacities and/or capabilities relative to other peers in the distributed virtual network. For example, the disparate peer may have less memory, bandwidth, and/or processing power than peers controlling adjacent virtual spaces. In some embodiments, the virtual space 20 may be subject to additional client load based on a greater quantity of clients and/or clients with more complex virtual interaction requirements. For example, a distributed virtual environment may support clients of varying degrees and/or different classes of service complexity. As such, a peer controlling an adjacent virtual space may negotiate to adjust the boundary 24 for serving clients towards the center of the virtual space 20. The virtual space 20 includes a border 21 that may remain unchanged and not be adjusted. The boundary 24 for transitioning service of a client may be adjusted to reduce the virtual space controlled by the disparate peer. In this manner, the experience of a user in the distributed virtual environment is less likely to be affected by inconsistencies and navigational problems that might otherwise be present as a result of the differences between the capacities of and/or demands on individual peers.

Figure 7:
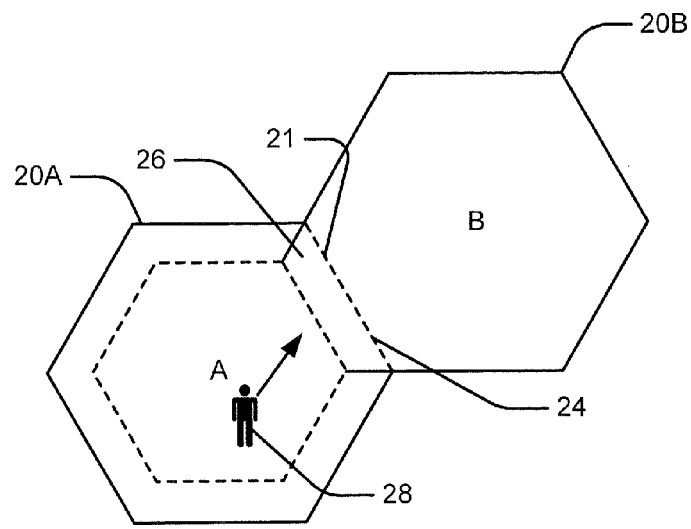
FIG. 7 is a block diagram illustrating an approximation area between adjacent peers in a distributed virtual environment according to some embodiments of the present invention.

Reference is now made to FIG. 7, which is a block diagram illustrating an approximation area between adjacent peers in a distributed virtual environment according to some embodiments of the present invention. As discussed above regarding FIG. 6, a disparate peer may negotiate to adjust a boundary 24 with an adjacent peer to provide a more consistent experience for a user in a distributed virtual environment. For example, a boundary 24 is adjusted between the virtual spaces 20A and 20B controlled by peers 10A and 10B, respectively. The area between the negotiated boundary 24 and the border 21 between the virtual spaces 20A and 20B is an approximation area in which peer 10B serves a client by approximating the virtual space otherwise controlled and/or generated by peer 10A. Thus, when the agent 28 moves into the approximation area 26, peer 10B may provide an approximation of the content of that portion of the virtual space 20A. The approximation area 26 may represent the portion of virtual space 20A that peer 10B assumes responsibility for. If the agent 28 moves beyond the approximation area 26 and crosses the border 21, the agent enters the virtual space 20B that is controlled by peer 10B and the client may be served by peer 10B according to the agent presence in virtual space 20B.

Although virtual spaces 20A and 20B are illustrated, the boundaries 24 of other adjacent virtual spaces may be similarly adjusted. In some embodiments, the boundaries 24 between each pair of adjacent virtual spaces 20A and 20B may be adjusted independently based on the relative capacities of the respective peers. For example, although FIG. 7 illustrates virtual space 20A being reduced as to the boundary 24 with virtual space 20B, other virtual spaces may be adjacent 20A and be controlled by peers that are disparate relative to peer 10A. Thus, peer 10A may negotiate to approximate a portion of the virtual space of another adjacent virtual space while having a portion of virtual space 20A approximated by peer 10B. In some embodiments, the space approximated by peer 10B may include virtual objects as defined by peer 10A. the virtual objects may be approximated at various levels of performance. For example, an appearance characteristic may be approximated while other characteristics and/or properties, such as behavioral and/or interactive functions, may not be approximated.

Figure 8:
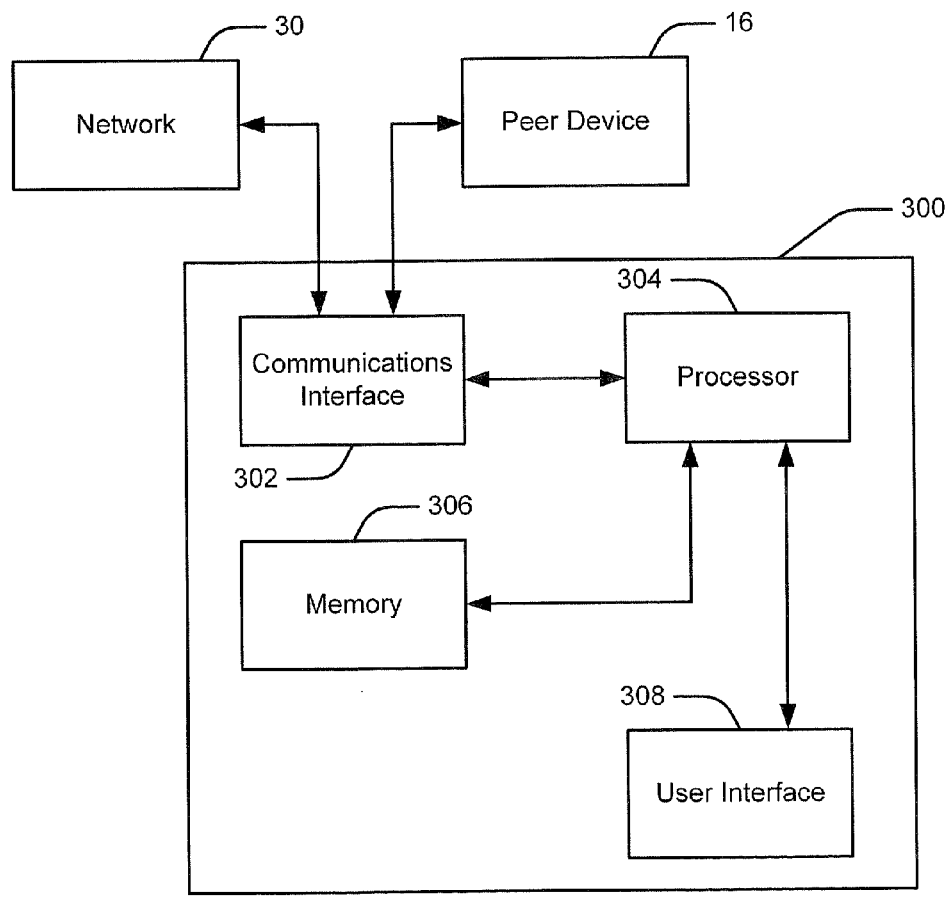
FIG. 8 is a block diagram illustrating a system in a distributed virtual environment according to some embodiments of the present invention.

Reference is now made to FIG. 8, which is a block diagram illustrating a system 300 in a distributed virtual environment according to some embodiments of the present invention. A system 300 may be configured to be a peer and connect to other peer devices 16 directly and/or via a network 30. The system 300 may be configured to control a virtual space and/or serve clients in a distributed virtual environment. A system 300 includes a communications interface 302 configured to provide communications between the system 300 and a network 30 and/or a peer device 16. In some embodiments, the network 30 can be used exclusively to provide network connections to other peers. In some embodiments, a P2P connection can be directly between peers and/or through the network 30.

The communications interface 302 is communicatively coupled to a processor 304 configured to perform system data processing tasks that may include controlling a virtual space. In some embodiments, the system 300 may be configured to run a client software application. Processing tasks may include negotiating a boundary with a peer controlling an adjacent virtual space and serving one or more clients navigating the distributed virtual environment. The processor 304 may utilize memory 306 for storing data associated with the processing tasks. The system 300 may also include a user interface 308 configured to permit a user to access, use and/or control the system 300.

Figure 9:
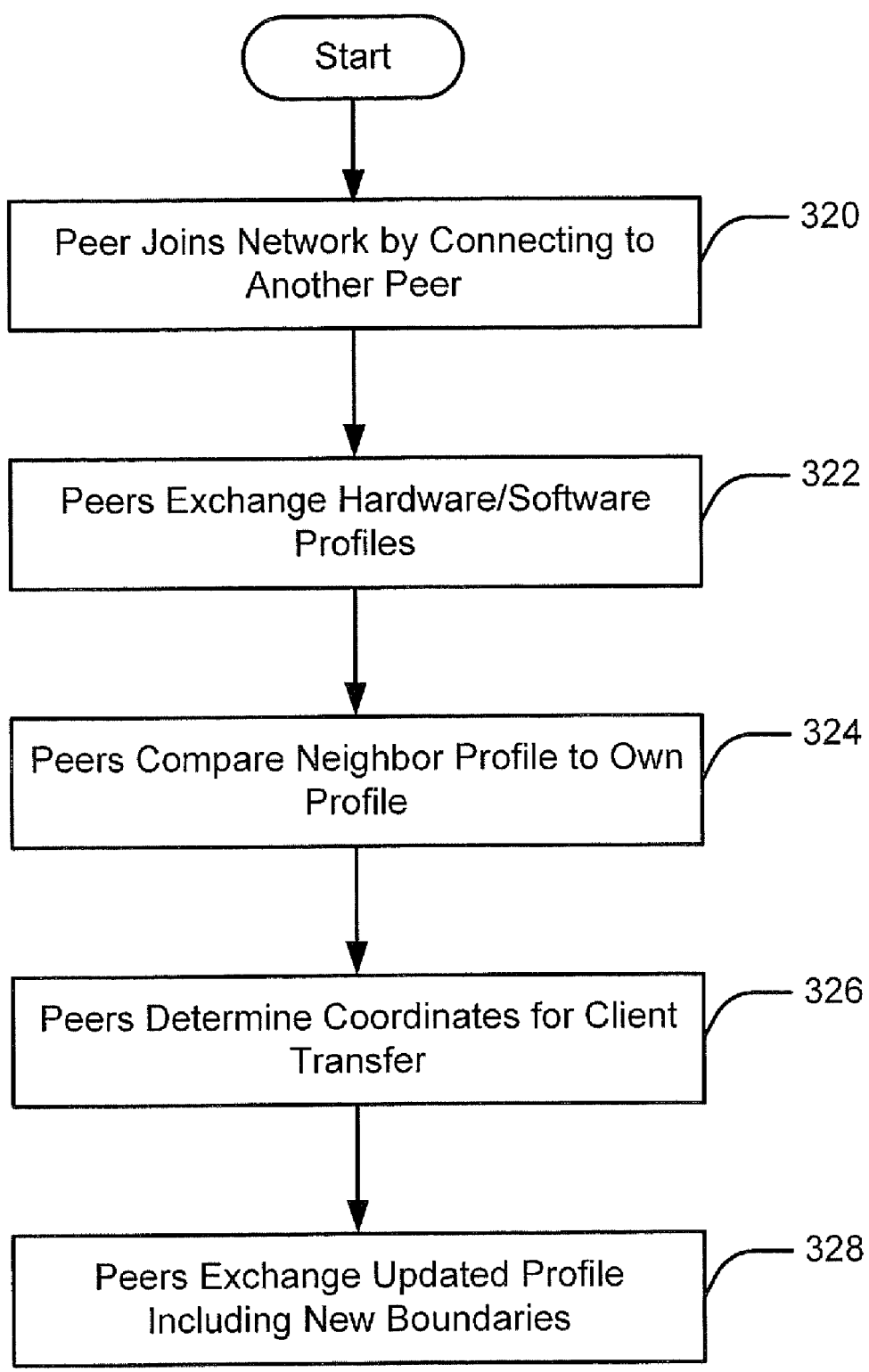
FIG. 9 is a flow diagram illustrating operations in a distributed virtual environment according to some embodiments of the present invention.

Reference is now made to FIG. 9, which is a flow diagram illustrating operations in a distributed virtual environment according to some embodiments of the present invention. Operations in a distributed virtual network begin when a peer joins a network for a distributed virtual environment by connecting to another peer or peers (block 320). P2P networks may use various techniques for finding and connecting to peers who are already in the P2P network. For example, a list of peers that are or have been connected to the network may be published through some venue other than the P2P network, including, for example, another network, such as the interne.

The connected peers then may exchange hardware and/or software profiles with each other (block 322). Since peers may have significant differences in hardware and software, the exchange of profile data facilitates a negotiation between the peers. The profile data may include information such as make/model of the peer device, processing speed, memory capacities (RAM and permanent storage), video/display capabilities (resolution, color depth, video memory, screen size, GPU performance, etc.), system load and/or information regarding the virtual space that the peer controls. In some embodiments, the profile data may also include historical information including peer activity, peer usage, and/or previous peer negotiation data. The virtual space information may include actual graphical representations of the space, metadata, virtual object data, space popularity data and/or other virtual space relevant statistics and/or data. In some embodiments, the profile data may utilize identifiers from shared libraries or sources to communicate virtual space information.

The peers compare the profile received from an adjacent peer with their own profile to determine differences in profiles (block 324). In some embodiments, relative profile data may be generated responsive to the comparison of the profiles. By comparing the received profiles, each peer can determine its capabilities relative to the peer devices controlling the adjacent virtual spaces. In some embodiments, a "less than" or "greater than" determination may be made to generate the relative profile data. In some embodiments, some types of data, such as, for example, memory, CPU speed, and/or bandwidth, may be compared by performing a simple division on the numeric values in the profiles. For example, if the profile for peer A includes lists 512 MB of system memory and the profile for peer B lists 1.0 GB of system memory, peer A has 50% of the memory of peer B.

After comparing the profile data, peers determine coordinates for client transfer (block 326). Although the border that defines a virtual space does not change, boundaries that may be utilized to transfer clients between virtual spaces may be adjusted. Adjusting the boundary has the effect of changing what portion of a virtual space is served by its controlling peer. Continuing with the example of the previous paragraph, the boundary between the virtual spaces controlled by peers A and B may be adjusted to reduce the amount of virtual space in which peer A serves clients navigating the distributed virtual environment. The amount of reduction in the virtual space served by peer A may be a approximation zone in which peer B approximates the content of the virtual space controlled by peer A. In some embodiments, approximation data corresponding to the virtual content of the approximation zone may be received by an approximating peer.

After negotiating new coordinates in the distributed virtual environment for transferring clients from one peer to the other peer, the peers exchange updated profile data that includes the new boundary locations and/or coordinates (block 328). In this manner, each peer can compare the updated profiles to ensure that both peers are in agreement as to the new boundary coordinates. Moreover, the profiles received by other peers reflect the actual boundary locations instead of the pre-negotiation conditions. Although discussed in terms of a new peer joining the P2P network, the exchange and negotiation may be performed as a renegotiation responsive to any change in system, peer, and/or the distributed virtual environment.

Figure 10:
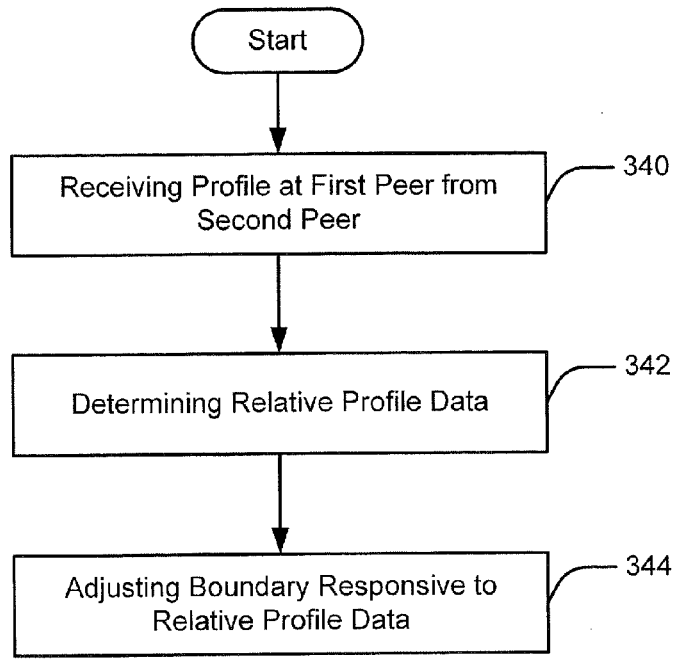
FIG. 10 is a flow diagram illustrating operations in a distributed virtual environment according to some other embodiments of the present invention.

Reference is made to FIG. 10, which is a flow diagram illustrating operations in a distributed virtual environment according to some other embodiments of the present invention. A profile from a second peer is received by a first peer (block 340). The first peer and the second peer control adjacent virtual spaces within a distributed virtual environment. The profile may include data corresponding to peer hardware, software, boundary and/or client data.

Client data may include the quantity of clients currently being served by the peer. In some embodiments, the client data may include data corresponding to the number of clients in different client classes and/or having different processing and/or interaction requirements. For example, a large quantity of clients served by a peer may significantly challenge the peer's ability to serve all clients in the virtual space. By adjusting the boundary to accommodate virtual spaces that are heavily loaded with clients, the virtual environment may be provided in a more uniform manner. Similarly, clients may include different classes such that one class of clients may be provided greater access, experience, and/or interaction in the virtual space. Thus, the client data may also reflect different quantities of clients in the different classes.

After receiving the profile, relative profile data is determined (block 342). The relative profile data may include differences in hardware, software, bandwidth, and/or client loading, among others. The relative profile data may be utilized to adjust a boundary between adjacent virtual spaces controlled by the first and second peers (block 344). By adjusting the boundary between the virtual spaces, a peer having greater capability relative to the other peer may assume responsibility for serving clients in a portion of the virtual space controlled by the less capable peer. The boundary may be adjusted using a formulaic and/or rule based approach that may be common to the distributed virtual environment. In this manner, differences in the capabilities of peers may be unnoticeable by clients navigating the distributed virtual environment. In some embodiments, the relative profile data may be used to generate a transition zone corresponding to a boundary. For example, if adjacent virtual spaces share a boundary and each include significantly different types and/or quantities of virtual objects, a transition zone may be generated in each of the adjacent virtual spaces on each side of the boundary. A transition zone may include modifications to the type and or quantities of virtual objects in one or both of the virtual spaces to reduce any perceptual impact of an abrupt transition from one virtual space to the other virtual space.

Figure 11:
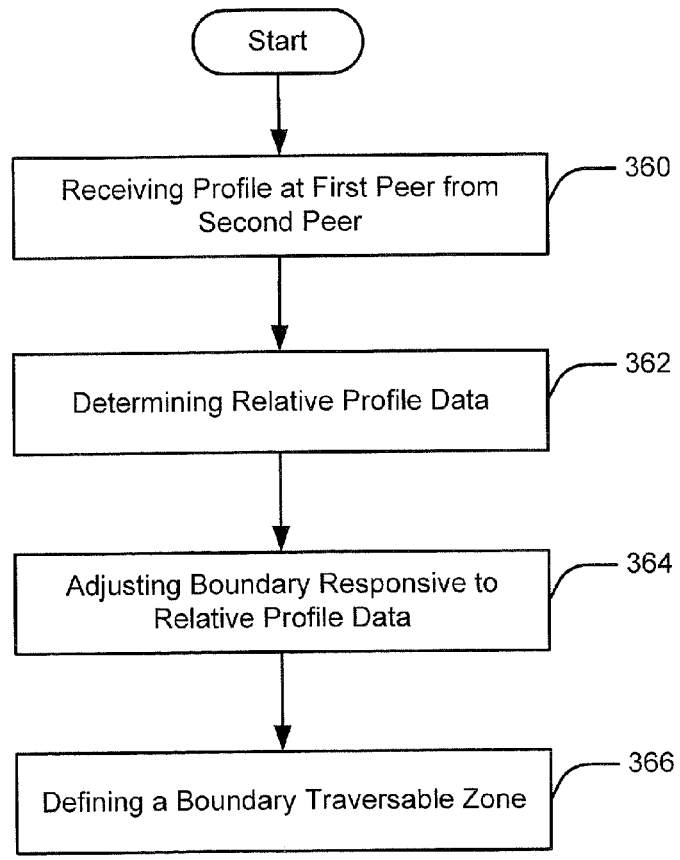
FIG. 11 is a flow diagram illustrating operations in a distributed virtual environment according to yet other embodiments of the present invention.

Brief reference is now made to FIG. 11, which is a flow diagram illustrating operations in a distributed virtual environment according to yet other embodiments of the present invention. A profile from a second peer is received by a first peer (block 360). After receiving the profile, relative profile data is determined (block 362). The relative profile data may include differences in hardware, software, bandwidth, and/or client loading, among others. The relative profile data is utilized to adjust a boundary between adjacent virtual spaces controlled by the first and second peers (block 364). By adjusting the boundary between the virtual spaces, a peer having greater capability relative to the other peer may assume responsibility for serving clients in a portion of the virtual space controlled by the less capable peer.

In some embodiments, a boundary traversable zone between respective virtual spaces may be defined in the negotiation between the first peer and the second peer (block 366). The boundary traversable zone may be a portion of the boundary between peers that is designated for client agents to traverse the boundary. In some embodiments, a boundary traversable zone may be a virtual bridge, mountain pass, gate, door and/or other virtual structural feature that provides a defined traversable zone for the client agent to cross a boundary and/or border. In some embodiments, the virtual structural features may be virtual objects that may be provided responsive to a boundary negotiation. For example, a virtual space may feature a river along its boundary and provide a bridge for crossing the river and entering an adjacent virtual space. In some embodiments, peers may each define the virtual locations of their boundary traversable zones. In some embodiments, peers may negotiate a location along the boundary for a common boundary traversable zone.

Figure 12:
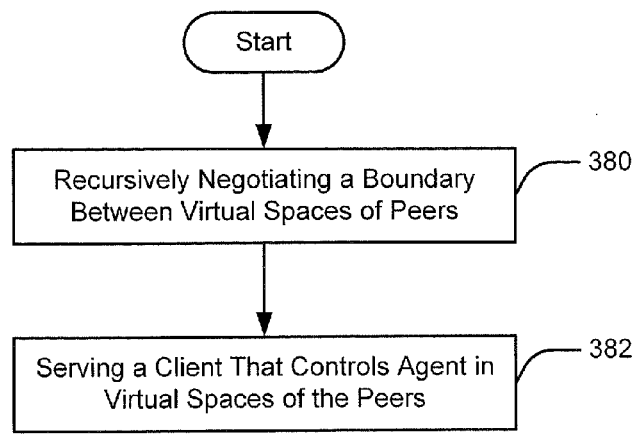
FIG. 12 is a flow diagram illustrating operations in a distributed virtual environment according to further embodiments of the present invention.

Reference is now made to FIG. 12, which is a flow diagram illustrating operations in a distributed virtual environment according to further embodiments of the present invention. A boundary between virtual spaces of peers is recursively negotiated (block 380). A client that controls an agent in the virtual spaces controlled by the peers is served by the peer controlling the virtual space in which the agent is in (block 382). By recursively negotiating the boundary, peers of varying capabilities may join to provide a distributed virtual environment that is responsive to changing virtual environment conditions. For example, if a first peer is serving a large number of clients relative to a second, adjacent peer, the boundary between the peers may be adjusted to reduce the virtual space controlled by the first peer and increase the amount of virtual space controlled by the second peer. In this manner, recursively negotiating a boundary facilitates renegotiation based on changing conditions. When a peer assumes control of a portion of virtual space previously controlled by another peer, the assuming peer may receive data from the controlling peer relative to the content of the portion of virtual space. The assuming peer may provide an approximation of the content of the portion to clients having agents in that portion.

Figure 13:
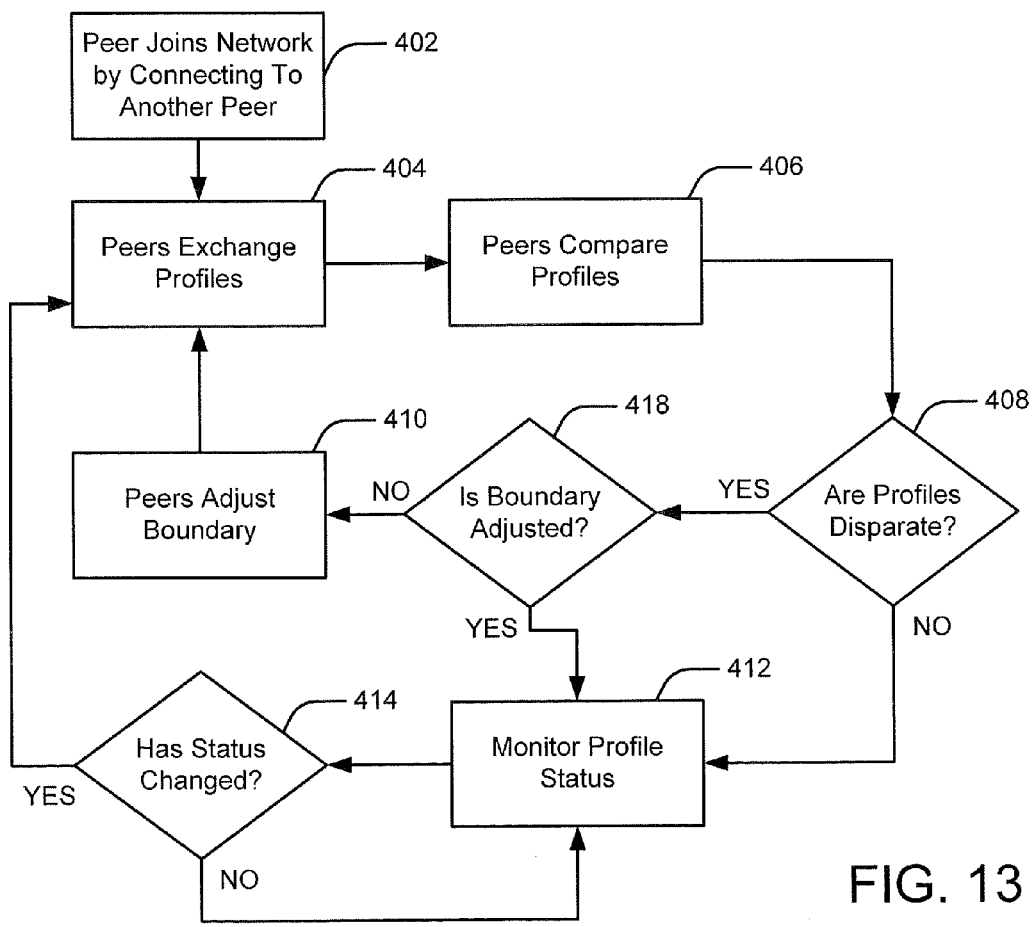
FIG. 13 is a flow diagram illustrating operations in a distributed virtual environment according to some embodiments of the present invention.

Reference is now made to FIG. 13, which is a flow diagram illustrating operations in a distributed virtual environment according to some embodiments of the present invention. A peer joins a network by connecting to another peer (block 402). Joining a P2P network may be performed using a variety of methods. For example, a connecting peer may access a list of peers that are already or have previously been attached to the network. In some embodiments, such a list may be published through some venue unrelated to the P2P network, such as a web site or other similar network resource.

Network peers exchange hardware and/or software profiles (block 404). The profiles may include profile data corresponding to the peer's capabilities relative to serving clients that access virtual spaces controlled by the peers. For example, a profile may include make, model and/or type of the peer device, processing speed, memory capacity, video/display capabilities, system load, and/or information regarding the virtual space that each peer controls. The peer device type may include a variety of mobile, fixed position, and/or personal processing and/or communication devices including computers, cell phones, game devices, and/or personal digital assistants (PDA's). Information regarding the virtual space may include virtual space identification data, actual graphical representations, shared library resource identifiers, metadata, popularity of the virtual space, and/or states of virtual objects and/or client agents in the virtual space.

After receiving a profile, a peer compares the received profile to his own profile (block 406). A comparison may include a "greater than" or "less than" binary type of comparison. A binary type of comparison may be applicable to, for example, fields such as memory, processor speed, and/or bandwidth when evaluating hardware capability. In some embodiments, a simple division of the numerical values in the profiles can be used to determine a comparison factor. In some embodiments, client data may be compared to determine relative loading. For example, where a first peer lists 512 MB of memory and a second peer lists 1.0 GB of memory, a memory comparison factor between the two peers may be 0.50. By comparing the profiles, the peers can determine if the profiles are disparate such that one peer is suboptimal relative to the other peer (block 408). If the profiles are disparate, then peers can determine if the boundary has been adjusted to compensate for the disparity (block 418).

If the profiles are disparate and the boundary has not been adjusted for the disparity, then the peers may adjust the boundary between their respective virtual spaces (block 410). By adjusting the boundary, a first peer having reduced capabilities relative to an adjacent second peer can allow the second peer to approximate a portion of the first peer's virtual space. The boundary adjustment may be performed based on rules within the distributed virtual environment. For example, some rules may provide for variable boundary adjustment responsive to values of comparison factors and/or the quantity of disparate factors. In some embodiments, rules may provide that a boundary adjustment is fixed to one or more predefined intervals depending on relative profile data. Some embodiments may weigh certain profile factors more heavily than others when adjusting a boundary. In some embodiments, the relative profile data may be used to generate a composite correction value that may be used to determine if and/or how much to adjust a boundary. After adjusting a boundary, the peers exchange profiles again (block 404) and perform the comparison (block 406). The exchanged profiles include the new coordinates of the adjusted boundary.

If the profiles are disparate and the boundary is adjusted to compensate for the disparity, each peer monitors the status of his virtual space (block 412). Similarly, if the profiles are not disparate, then no boundary adjustment determination is made and each peer monitors the status of his virtual space (block 412). In some embodiments, the status is determined by the profile data. In this manner, updating and monitoring the profile will provide indicia of a change in status. Status changes may be, for example, changes in client data and/or loading, changes in controlled space due to negotiation with other peers, and/or changes in bandwidth of a peer, among others. If the status remains unchanged then the peer continues to monitor (blocks 414, 412). If a virtual space status changes, the peers exchange profiles (blocks 414, 404). In this manner, a boundary between virtual spaces is recursively negotiated by the peers controlling the respective virtual spaces.

In the drawings and specification, there have been disclosed exemplary embodiments of the invention. However, many variations and modifications can be made to these embodiments without substantially departing from the principles of the present invention. All such variations and modifications are intended to be included herein within the scope of the present invention, as set forth in the following claims.

That which is claimed is:

1. A method for providing peer-to-peer negotiation between first and second peers in a distributed virtual environment, the method comprising:
   receiving profile data at the first peer controlling a first virtual space in the distributed virtual environment from the second peer controlling a second virtual space adjacent to the first virtual space in the distributed virtual environment, wherein the first virtual space comprises a first surface area and has a first boundary and the second virtual space comprises a second surface area and has a second boundary which is at least in part contiguous with a portion of the first boundary, wherein the first peer serves those clients of a plurality of clients having an agent in the first virtual space, and the second peer serves those clients of a plurality of clients having an agent in the second virtual space;
   determining relative profile data by comparing profile data of the first peer and the profile data of the second peer; and
   adjusting the first boundary and the second boundary between the first virtual space and the second virtual space responsive to the relative profile data to diminish a size of the first virtual space and to enlarge a size of the second virtual space.

2. The method of claim 1, further comprising serving a client controlling an agent that exists within the distributed virtual environment by providing at least one virtual object.

3. The method of claim 2, wherein the agent interacts with the at least one virtual object responsive to a location of the agent relative to the first boundary.

4. The method of claim 1, wherein a client controls an agent in the distributed virtual environment and wherein adjusting the first boundary comprises defining an approximation space extending beyond the first boundary and configured to transition the agent from the first virtual space to the second virtual space.

5. The method of claim 1, wherein the approximation space changes dimensionally responsive to relative profile data.

6. The method of claim 4, wherein the approximation space changes location relative to the boundary responsive to relative profile data.

7. The method of claim 1, wherein the profile data comprises hardware data, software data, virtual object data, and/or client data.

8. The method of claim 1, further comprising defining a boundary traversable zone configured to define portions of the first boundary that are traversable by a client to move from one of the first virtual space or the second virtual space to another of the first virtual space or the second virtual space.

9. The method of claim 1, wherein receiving profile data is performed responsive to the second peer joining the distributed virtual environment.

10. The method of claim 1, wherein receiving profile data is performed responsive to a change in profile data of the first peer and/or the second peer.

11. The method of claim 1, wherein relative profile data comprises a difference in hardware capacity between the first peer and the second peer.

12. The method of claim 1, wherein the relative profile data comprises a difference in client data.

13. The method of claim 1, wherein adjusting the first boundary and the second boundary comprises reducing the first virtual space responsive to relative profile data indicative of greater resources of the second peer than resources of the first peer.

14. The method of claim 1, further comprising:
   receiving third peer profile data at the first peer from a third peer controlling a third virtual space adjacent to the first virtual space in the distributed virtual environment;
   determining third peer relative profile data by comparing the profile data of the first peer and the third peer profile data; and
   adjusting third peer boundary between the first virtual space and the third virtual space responsive to the third peer relative profile data.

15. A method for reducing a load on a peer computing device in a virtual environment comprising:
   receiving by a first peer computing device a second profile associated with a second peer computing device, the second profile identifying a characteristic of the second peer computing device, wherein the second peer computing device provides a second virtual space in the virtual environment, the second virtual space comprising a second surface area of the virtual environment and having a second boundary, wherein the second peer computing device serves only those clients of a plurality of clients which control a corresponding avatar that is located within the second boundary;
   comparing by the first peer computing device the second profile to a first profile associated with the first peer computing device, the first profile identifying a characteristic of the first peer computing device, wherein the first peer computing device provides a first virtual space in the virtual environment that is adjacent to the second virtual space, the first virtual space comprising a first surface area of the virtual environment and having a first boundary, wherein the first peer computing device serves only those clients of the plurality of clients which control a corresponding avatar that is located within the first boundary, and wherein the first boundary is at least in part contiguous with a portion of the second boundary;
   determining by the first peer computing device that the second peer computing device has a greater processing capability than the first peer computing device based on a comparison between the first profile and the second profile; and based on the comparison, adjusting the first boundary and the second boundary between the first virtual space and the second virtual space to diminish a size of the first virtual space and to enlarge a size of the second virtual space.

16. The method of claim 15 wherein the first virtual space and the second virtual space comprise landscapes in the virtual environment on which avatars in the virtual environment may travel.

17. The method of claim 15 wherein the characteristic of the first peer computing device comprises one of an amount of random access memory in the first peer computing device and an identity of a central processing unit in the first peer computing device.

18. A computer program product, the computer program product comprising a non-transitory computer-usable storage medium having computer-readable program code embodied in the medium, the computer-readable program code configured to perform steps for reducing a load on a peer computing device in a virtual environment, the steps comprising:

receiving by a first peer computing device a second profile associated with a second peer computing device, the second profile identifying a characteristic of the second peer computing device, wherein the second peer computing device provides a second virtual space in the virtual environment, the second virtual space comprising a second surface area of the virtual environment and having a second boundary, wherein the second peer computing device serves only those clients of a plurality of clients which control a corresponding avatar that is located within the second boundary;

comparing by the first peer computing device the second profile to a first profile associated with the first peer computing device, the first profile identifying a characteristic of the first peer computing device, wherein the first peer computing device provides a first virtual space in the virtual environment that is adjacent to the second virtual space, the first virtual space comprising a first surface area of the virtual environment and having a first boundary, wherein the first peer computing device serves only those clients of the plurality of clients which control a corresponding avatar that is located within the first boundary, and wherein the first boundary is at least in part contiguous with a portion of the second boundary;

determining by the first peer computing device that the second peer computing device has a greater processing capability than the first peer computing device based on a comparison between the first profile and the second profile; and based on the comparison, adjusting the first boundary and the second boundary between the first virtual space and the second virtual space to diminish a size of the first virtual space and to enlarge a size of the second virtual space.

\* \* \* \* \*